UNITED STATES PATENT OFFICE 2,048,622

O-ALKYL ETHERS OF ALKALOIDS AND METHOD OF MAKING THEM

Frank Lee Pyman and Hyman Henry Lionel Levene, Nottingham, England, assignors to Boots Pure Drug Company Limited, Nottingham, England, a British company No Drawing. Application September 28, 1931, Serial No. 565,702. In Great Britain October 4, 1930

13 Claims. (Cl. 260—25)

This invention relates to the production of O-alkyl ethers and substituted O-alkyl ethers higher than the methyl ethers of harmol,

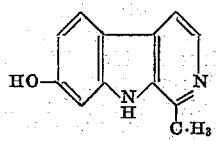

and harmalol,

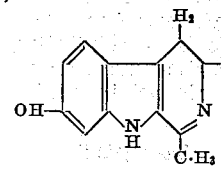

which is a dihydroderivative of harmol. O-alkyl derivatives of these bodies, with the exception of the methyl ethers which occur naturally as harmine and harmaline, have not hitherto been known, and it is the object of the present invention to produce the higher o-alkyl and substituted o-alkyl derivatives of harmol and harmalol synthetically as such derivatives have valuable properties.

According to the present invention, harmol or harmalol is acted upon by an alkylating agent or a substituted alkylating agent in the presence of a caustic alkali, such as caustic soda or caustic baryta, so as to alkylate the hydroxyl group in order to produce the higher alkyl derivative or substituted alkyl derivative of the alkaloid which is used as the starting material. These derivatives higher than the methyl derivatives are obtained in excellent yield by refluxing harmol or harmalol dissolved in the theoretical amount of an alcoholic solution of caustic alkali with one molecular proportion of an alkylating agent, and when the reaction is complete, the o-alkyl harmol or harmalol is separated by suitable means from the small quantity of unchanged alkaloid which remains and any N-alkylated alkaloid which may have been formed. Since the starting alkaloids contain both a phenolic group and an atom of nitrogen which can be alkylated, it should be mentioned that it could not be foreseen that there was a method by means of which the hydroxyl group could be alkylated while at the same time the N-alkylation could be reduced to a minimum. The alkyl ethers and substituted alkyl ethers higher than the methyl ethers of harmol and harmalol obtained by the novel process of the present invention have very valuable properties; thus, O-normal butyl harmol has a very high phenol coefficient which is about 350, while some of the higher ethers such as the heptyl, octyl and nonyl compounds of harmol have a high amoebicidal efficiency in comparison with that of emetine hydrochloride.

In order that the invention may be clearly understood and readily carried into effect, some examples will now be described in detail for the production of certain of the higher derivatives of the two alkaloids.

Example 1

In the production of O-normal-propyl harmol, 6 parts by weight of harmol are dissolved in a solution of 7.5 parts by weight of 5-normal caustic soda in 145 parts by weight of alcohol. 3.75 parts by weight of normal propyl bromide are added to the resulting solution and the whole is boiled under a reflux condenser until the solution has a neutral reaction. The solvent is evaporated off and the residue is ground with a sufficient quantity of dilute solution of caustic soda to remove any unchanged harmol and any small quantity of the N-propyl derivative which may be formed. The base, which is insoluble in the caustic soda, is the O-normal-propyl harmol, the desired product of the reaction, and it may be purified by recrystallization from aqueous alcohol, when it is obtained in the form of colourless needles which melt at 204.5° C. (corrected). The base is very soluble in alcohol and chloroform. The hydrochloride may be obtained, for example, by dissolving 3.5 gms. of the base in 10 cc. of hot alcohol and by adding 10 cc. of concentrated hydrochloric acid and cooling. The salt thereupon separates out in the form of needles, which may be recrystallized from water or from alcohol. The O-normal-propyl harmol hydrochloride so obtained melts at 259 to 261° C. (corrected), and is soluble to the extent of rather more than 2 per cent in water at 20° C.

Example 2

In the manufacture of O-isopropyl harmol, 5 parts by weight of harmol are dissolved in 112 parts by weight of alcohol and 6.25 parts by weight of 5-normal caustic soda solution; 3.12 parts by weight of isopropyl bromide are added, and the mixture is refluxed until the reaction is complete. The o-isopropyl harmol is isolated in a manner similar to that described above under Example 1, and when pure it forms colourless needles which melt at 180.5 to 181° C. (corrected). Its properties are similar to those of o-normal propyl harmol, and it may be converted into a hydrochloride which melts at 277.5° C. (corrected), and which is soluble in 65 parts of water at 20° C. The salt when crystallized from an aqueous solution, contains one molecule of water of crystallization, which, however, is given off on heating to 100° C.

*Example 3*

In the manufacture of O-normal butyl harmol, 7 parts by weight of harmol are boiled under a reflux condenser with 160 parts by weight of alcohol, 8.7 parts by weight of 5-normal caustic soda solution, and 4.85 parts by weight of normal butyl bromide until the solution has no alkaline reaction. The alcohol is evaporated off, and any n-butyl harmol which may have been formed is removed along with any unchanged harmol, by washing the product with dilute caustic soda solution. The O-normal butyl harmol remaining may be purified either by recrystallization from a suitable solvent, or it may be converted directly into the hydrochloride by dissolving it in alcohol and adding concentrated hydrochloric acid. The salt may then be recrystallized from alcohol. The O-normal butyl harmol produced as described above has a melting point of 220° C. (corrected), and the hydrochloride melts at 232 to 234° C. (corrected). This hydrochloride has a very high Rideal Walker coefficient, probably considerably above 200.

*Example 4*

In making O-normal butyl harmalol, a molecular quantity of harmalol is dissolved in a molecular quantity of caustic soda solution in alcohol and refluxed with the theoretical amount of normal butyl bromide until the reaction becomes neutral. After washing the product of the reaction with dilute caustic soda, the base remaining is dissolved in boiling alcohol and concentrated hydrochloric acid is added in slight excess. The hydrochloride of the O-normal butyl harmalol separates out on cooling in the form of small yellowish needles, which may be recrystallized from alcohol or water. The salt melts at 213.5° C. (corrected), and it may be converted back into the base, for example, by dissolving in hot alcohol and adding excess of 5-normal ammonia. The base separating on cooling may be recrystallized from dilute alcohol, and thus prepared it forms long almost colourless needles which melt at 173° C. (corrected). The hydrochloride is soluble in water to the extent of 1.5 per cent at body temperature and has a Rideal Walker coefficient of approximately 100.

*Example 5*

In making O-normal heptyl harmol, 8 parts by weight of harmol are dissolved in the theoretical amount of caustic soda in 160 parts of alcohol and, after the addition of 7.5 parts by weight of normal heptyl bromide, the whole is boiled under a reflux condenser during 45 hours. After removal of the solvent by distillation, the residue is washed with dilute caustic soda solution and the residual oil solidifies. This is the required base which, after suitable purification, for example by crystallization from dilute alcohol, is obtained as colourless leaflets which melt at 131 to 132° C. The hydrochloride of the base has a melting point of 228° C. and crystallizes in colourless needles. It has a considerable amoebicidal action.

*Example 6*

In making O-normal dodecyl harmol, equimolecular proportions of harmol, caustic soda and lauryl bromide are refluxed in alcoholic solution until the reaction is complete. The product is worked up as before described, and after purification the o-normal dodecyl harmol is obtained as a colourless solid, crystallizing from alcohol in needles which melt at 119 to 120° C. and the hydrochloride forms colourless crystals which melt at 208 to 208.5° C. When cooled to the ordinary temperature a 2.5 per cent solution of the hydrochloride in water sets to a stiff gel.

*Example 7*

In the preparation of o-diethylaminoethyl harmol 4 parts of harmol are dissolved in a solution of 0.8 parts by weight of caustic soda in 30 parts of water and 3 parts of $\beta$-chlorethyl-diethylamine are added, after which the whole is heated on the steam bath under a reflux condenser until no further reaction takes place. A dark coloured oil has during the heating separated from the solution and this, after cooling, is extracted with chloroform which may then be removed and the recovered oil treated with excess of hydrochloric acid and the hydrochloride of the base precipitated by means of acetone. The dihydro-chloride which is thus produced may be purified by recrystallization from a suitable solvent and forms needles which melt at about 295° C. The o-diethylamino ethyl harmol may be obtained from the hydrochloride by precipitating with excess of caustic soda in the usual manner. It crystallizes from dilute alcohol in needles which melt at 167 to 168° C.

*Example 8*

In the production of o-benzyl harmol, 8 parts by weight of harmol are mixed with the theoretical amount of 5-normal caustic soda solution and 280 parts by weight of alcohol, and after 5 parts by weight of freshly distilled neutral benzyl chloride have been added, the whole is refluxed for 5 hours. The reaction mixture is concentrated to a small bulk and warmed with a dilute caustic soda solution to remove salt and unchanged harmol. The insoluble residue crystallizes on cooling and it may be purified by conversion into the hydrochloride which may conveniently be done by dissolving it in a mixture of 25 parts of alcohol and 30 parts of acetone and running the solution into a mixture of 25 parts of concentrated hydrochloric acid and 50 parts of acetone. The crystals which separate may be recrystallized from an alcohol acetone mixture. When pure the hydrochloride forms colourless needles which melt at 257° C. The o-benzyl harmol which may be obtained in the usual manner from the hydrochloride forms colourless needles which melt at 213° C.

*Example 9*

In the production of o-normal propyl harmalol, 9 parts by weight of harmalol are refluxed for about 24 hours with a solution of 160 parts by weight of alcohol, 10.6 parts by weight of 5-normal caustic soda, and 5.7 parts by weight of normal propyl bromide, and the product is worked up in the usual manner. 9 parts by weight of the crude base obtained is dissolved in 18 parts of alcohol and 18 parts of concentrated hydrochloric acid added, whereupon the pure hydrochloride of the base crystallizes out of the solution. The hydrochloride melts at 232 to 234° C. and forms pale yellow needles from which the base may be obtained by the addition of ammonia to an alcoholic solution. The base itself, o-normal propyl harmalol, crystallizes from dilute alcohol in needles which melt at 196–197° C.

Example 10

In the preparation of o-normal nonyl harmol, molecular proportions of harmol, caustic soda and normal nonyl bromide are refluxed in alcoholic solution for about 36 hours, after which the alcohol is recovered by distillation and the residue is washed with dilute caustic soda solution. The residue may be purified in any convenient manner, a suitable method being to dissolve it by heating in acetone containing a little hydrochloric acid and then to add excess of the acid, whereupon on cooling the hydrochloride crystallizes out. The hydrochloride may be recrystallized from a mixture of alcohol and acetone and is finally obtained in the form of colourless needles which melt at 205 to 207° C. o-normal nonyl harmol itself may be obtained from the hydrochloride by treating with ammonia, and it forms colourless needles which melt at 114° C.

Example 11

In the production of o-normal amyl harmol, the reaction between harmol and normal amyl bromide is carried out in the presence of an alcoholic solution containing the theoretical amount of caustic soda; the alcohol is removed and the residue washed with dilute caustic soda solution, when the desired base remains behind in a slightly impure form. It may be purified by recrystallization from dilute alcohol, when it is obtained in the form of fine needles which melt at 206 to 207° C. The hydrochloride of the base may be obtained by dissolving the base itself in alcoholic hydrochloric acid, and after recrystallization from a mixture of alcohol and acetone, it is obtained as a body consisting of long silky needles containing water of crystallization. The melting point of the anhydrous salt is about 192 to 194° C.

It will be realized that the invention is not limited to the manufacture of the particular bodies set out in the above examples as, for example, it may be applied to the production of other o-alkyl ethers of harmol including, for example, ethyl, isoamyl, normal hexyl, normal octyl, secondary octyl, normal decyl and isodecyl derivatives and the same derivatives of harmalol, and also including normal amyl harmalol and normal nonyl harmalol. The invention is also applicable to the production of substituted ethers of harmol and harmalol higher than the methyl ether.

We claim:—

1. The process for the production of an o-alkyl ether of the class set forth which consists in effecting a reaction between an alkaloid of the group consisting of harmol and harmalol and an alkyl halide in the presence of a caustic alkali in an inert solvent.

2. O-normal-nonyl harmol, said substance having a high amoebicidal efficiency.

3. A process for producing an o-alkyl ether of the class set forth, which comprises alkylating an alkaloid of the group consisting of harmol and harmalol in the presence of a solution of a caustic alkali in an inert solvent.

4. A process for the production of an o-alkyl ether of the class set forth, which consists in effecting a reaction between substantially equivalent molecular proportions of an alkaloid of the group consisting of harmol and harmalol, an alkyl halide and a caustic alkali in an inert solvent.

5. O - normal - butyl - harmol, said substance having a phenol coefficient of about 350.

6. O - normal - heptyl - harmol, said substance having a high amoebicidal efficiency.

7. An o-alkyl ether of harmol within the range of which the end members are a propyl and a decyl ether respectively, said substance having a high therapeutic efficiency.

8. In a process for producing an o-alkyl ether of the class set forth, the step which consists in alkylating an alkaloid of the group consisting of harmol and harmalol by boiling in the presence of a solution of a caustic alkali in an inert solvent.

9. A process for the production of an o-alkyl ether of the class set forth, which consists in boiling together substantially one molecular proportion of an alkyl halide and an alkaloid of the group consisting of harmol and harmalol dissolved in substantially the theoretical amount of a solution of caustic soda in an inert solvent.

10. A process for the production of an o-alkyl ether of the class set forth, which consists in boiling together an alkyl halide and an alkaloid of the group consisting of harmol and harmalol dissolved in a solution of caustic alkali in an inert solvent.

11. A process for producing an o-alkyl ether of the class set forth which consists in alkylating an alkaloid of the group consisting of harmol and harmalol by heating such alkaloid in the presence of a solution of a caustic alkali in an inert solvent.

12. A process for the production of an o-alkyl ether of the class set forth, which consists in effecting a reaction under heat between substantially equivalent molecular proportions of the group consisting of harmol and harmalol, an alkyl halide, and a solution of a caustic alkali in an inert solvent.

13. The process for the production of an o-alkyl ether of the class set forth, which consists in effecting a reaction under heat between an alkaloid of the group consisting of harmalol and harmol, and an alkyl halide in the presence of a solution of a caustic alkali in an inert solvent.

FRANK LEE PYMAN.
HYMAN HENRY LIONEL LEVENE.